United States Patent [19]

Klusmier

[11] 4,446,961
[45] May 8, 1984

[54] APPARATUS AND METHOD FOR UNSCRAMBLING AND SEPARATING ELONGATED ELEMENTS

[75] Inventor: Kenneth L. Klusmier, Worcester, Mass.

[73] Assignee: Morgan Construction Company, Worcester, Mass.

[21] Appl. No.: 308,381

[22] Filed: Oct. 5, 1981

[51] Int. Cl.³ .......................................... B65G 47/12
[52] U.S. Cl. .................................. 198/443; 198/474; 198/774
[58] Field of Search ............... 198/443, 474, 614, 774, 198/775, 777, 455; 414/748

[56] References Cited

U.S. PATENT DOCUMENTS

| | | | |
|---|---|---|---|
| 1,889,039 | 11/1932 | Quinn | 198/774 |
| 3,130,830 | 4/1964 | Allbeson | 198/774 |
| 3,266,615 | 8/1966 | Sephton et al. | 198/774 |
| 3,724,648 | 4/1973 | Schaller | 198/443 |

FOREIGN PATENT DOCUMENTS 655451 3/1965 Belgium .............................. 198/474

Primary Examiner—Joseph E. Valenza
Assistant Examiner—Daniel Alexander
Attorney, Agent, or Firm—Thompson, Birch

[57] ABSTRACT

An apparatus and method for unscrambling and separating a plurality of elongated elements randomly deposited in a pile at a receiving station, and for delivering the elements individually to a discharge station is disclosed wherein small batches of the elements are removed from the pile at the receiving station into the first of a plurality of element separating stations arranged successively between the receiving station and the discharge station. Thereafter, the elements in each batch are shifted from one separating station to the next. This shifting occurs alternately in a forward direction towards the discharge station, and then in a reverse direction back towards the receiving station, with selected properly aligned elements in the separating stations being rearwardly bypassed and forwardly shifted.

5 Claims, 20 Drawing Figures

APPARATUS AND METHOD FOR UNSCRAMBLING AND SEPARATING ELONGATED ELEMENTS

BACKGROUND OF THE INVENTION

This invention relates generally to mechanical product handling devices, and is concerned in particular with an improved apparatus and method for unscrambling and separating randomly arranged piles of elongated elements such as metal bars, rods and the like of the type produced by rolling mills.

As a preliminary step to inspecting and then subjecting bundled bar products to further processing, including for example mechanical surface cleaning, the bundles are opened and the bars contained therein are dumped in a random pile at a receiving station. The pile is then "unscrambled" so as to separate the bars one from the other in parallel relationship in a single layer. Unscrambling is complicated by the fact that individual bars often become twisted or "jackstrawed", either during the bundle forming operation, or later when the bundles are opened. In the past, considerable effort has been expended in attempting to develop equipment capable of automatically unscrambling bars without requiring manual assistance from operating personnel. Examples of prior equipment proposals are disclosed in U.S. Pat. Nos. 3,831,779 (Curtis); 3,757,964 (Kaplan); 3,308,968 (Harrington); 3,306,472 (Blanz); 3,232,449 (Quin Shen); 3,214,001 (Callaghan); 3,171,532 (Weller et al); 2,955,696 (Spooner); 2,995,235 (Maier); 2,407,638 (Gettig et al); and 1,889,039 (Quinn). However, experience has indicated that these prior attempts at automation have been largely unsuccessful, and that manual handling of the bars has continued to be necessary. Manual bar handling is a tedious and time-consuming operation, in addition to being extremely hazardous.

SUMMARY OF THE INVENTION

The basic objective of the present invention is to provide an improved apparatus and method for unscrambling and separating bar products, with the capability of operating automatically without manual assistance from operating personnel.

A preferred embodiment will hereinafter described in greater detail in connection with the handling of round bars of the type produced by hot rolling in a bar mill. The invention includes a plurality of stationary rack members extending in parallel relationship from a receiving station at which bars are deposited in a random pile, to a discharge station at which individual bars are to be arranged in parallel relationship in a single ordered layer. The stationary rack members have upwardly facing notches aligned laterally to form a succession of intermediate separating stations. A first transfer device is employed to shift small batches of bars from the pile at the receiving station into the first of these separating stations. Second and third transfer devices then operate to shift these bars from one separating station to the next. This shifting occurs alternately in a forward direction towards the discharge station, and then in a reverse direction back towards the receiving station. Selected properly aligned bars are bypassed during each reverse shifting operation and are then moved forwardly to the next station during the forward shifting operation. In this manner, skewed or jackstrawed bars are properly reoriented and all bars are eventually separated and aligned in parallel relationship before arriving at the discharge station.

DETAILED DESCRIPTION OF PREFERRED EMBODIMENT

Figure 1:
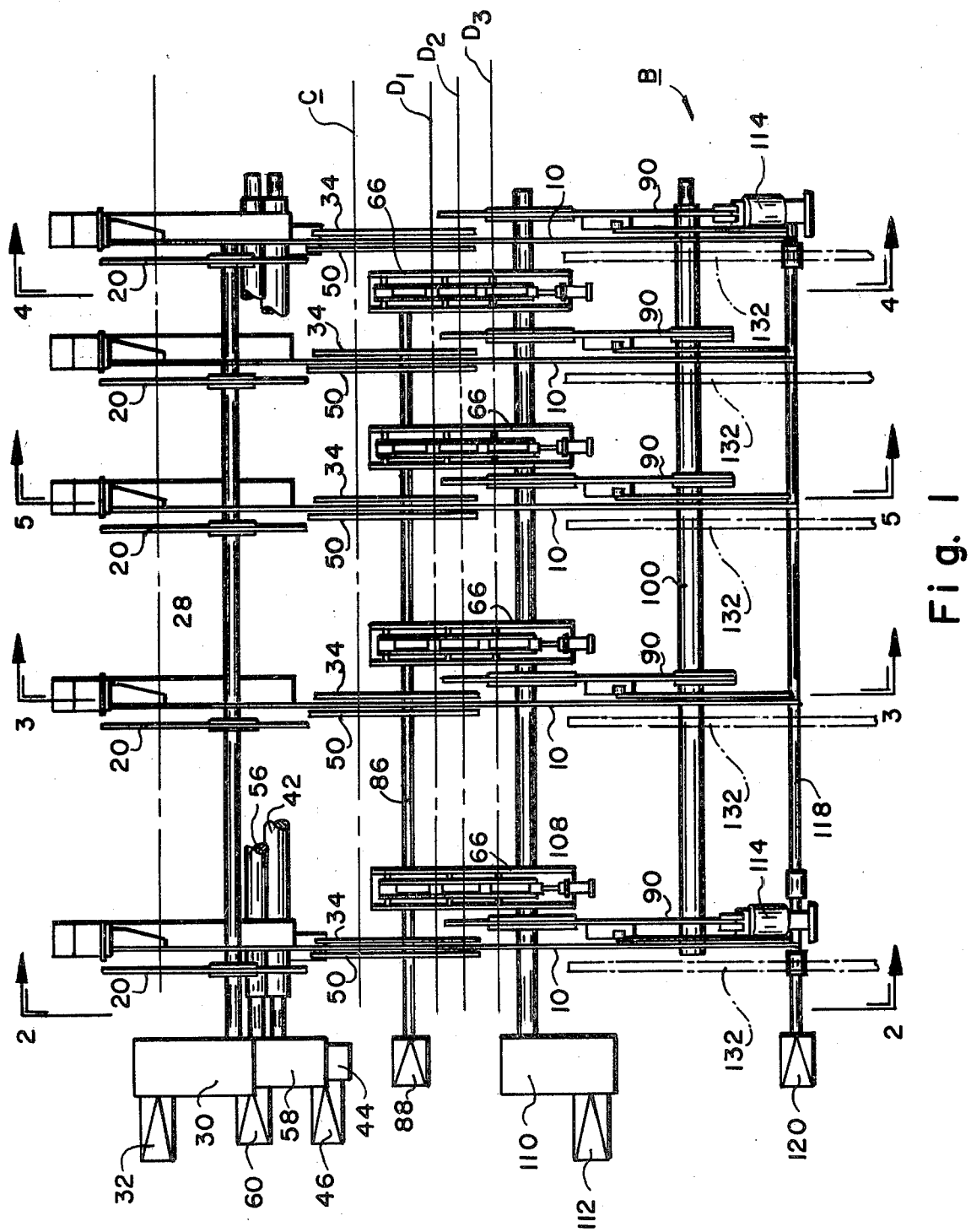
FIG. 1 is a plan view of a bar handling apparatus in accordance with the present invention.

Referring initially to FIGS. 1–5, the apparatus of the present invention includes a plurality of parallel stationary rack members 10 extending forwardly from a receiving station "A" to a delivery station "B". As can best be seen in FIG. 4, each rack member 10 has an elevated horizontal edge section 12 extending across the receiving station A, another lower horizontal edge section 14 extending into the delivery station B, and a plurality of intermediate edge sections 16, 18 which are inclined respectively downwardly and upwardly in the forward direction to define upwardly facing notches. The corresponding notches of each rack member are aligned laterally to form a batch receiving station "C" and a succession of separating stations "$D_1$–$D_3$" leading towards the delivery station B.

Figure 2:
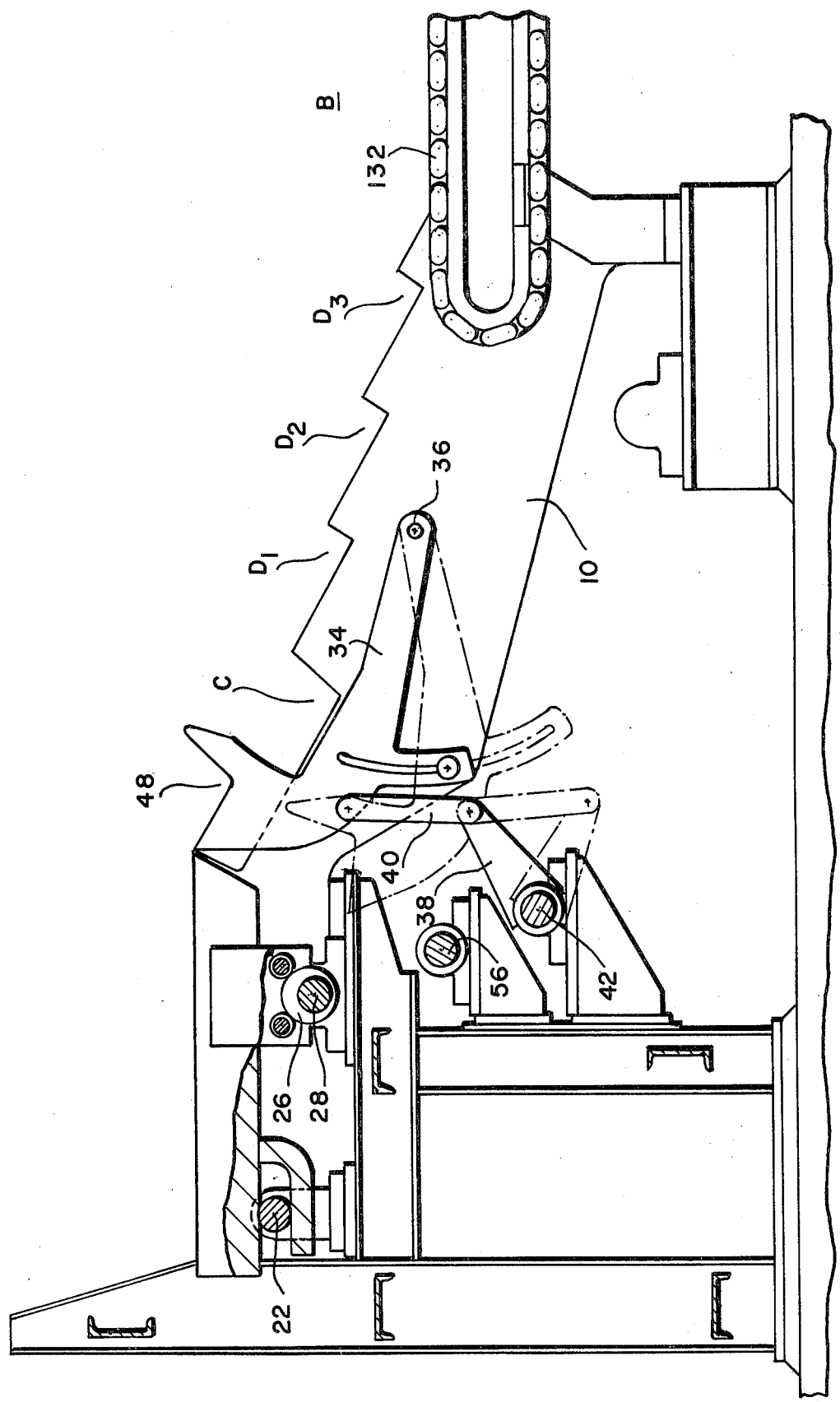
FIGS. 2–5 are sectional views on an enlarged scale taken along lines 2—2, 3—3, 4—4 and 5—5 of FIG. 1.

With reference particularly to FIGS. 1 and 2, conventional shuffle bars 20 are located adjacent to the rack members 10 at the receiving station A. Each shuffle bar has one end movably supported on a roller 22, and its opposite end has a saddle 24 riding on an eccentric 26 carried on a cross shaft 28. The cross shaft 28 is driven through a gear reducer 30 by a motor 32. Receiver arms 34 are located directly adjacent to the receiving station A. Each receiver arm is pivotally connected to a rack member 10 as at 36, and is adjustable between a raised position as shown by the solid lines in FIG. 2 and a lowered position as shown by the dot-dash lines in the same figure. This pivotal adjustment is accomplished by a crank arm 38 connected to each receiver arm by means of an intermediate link 40. The crank arms 38 are in turn keyed to a cross shaft 42 driven through a gear reducer 44 by a reversible electric motor 46. The upper end of each receiver arm 34 has converging edges forming a receiving notch 48.

Figure 3:
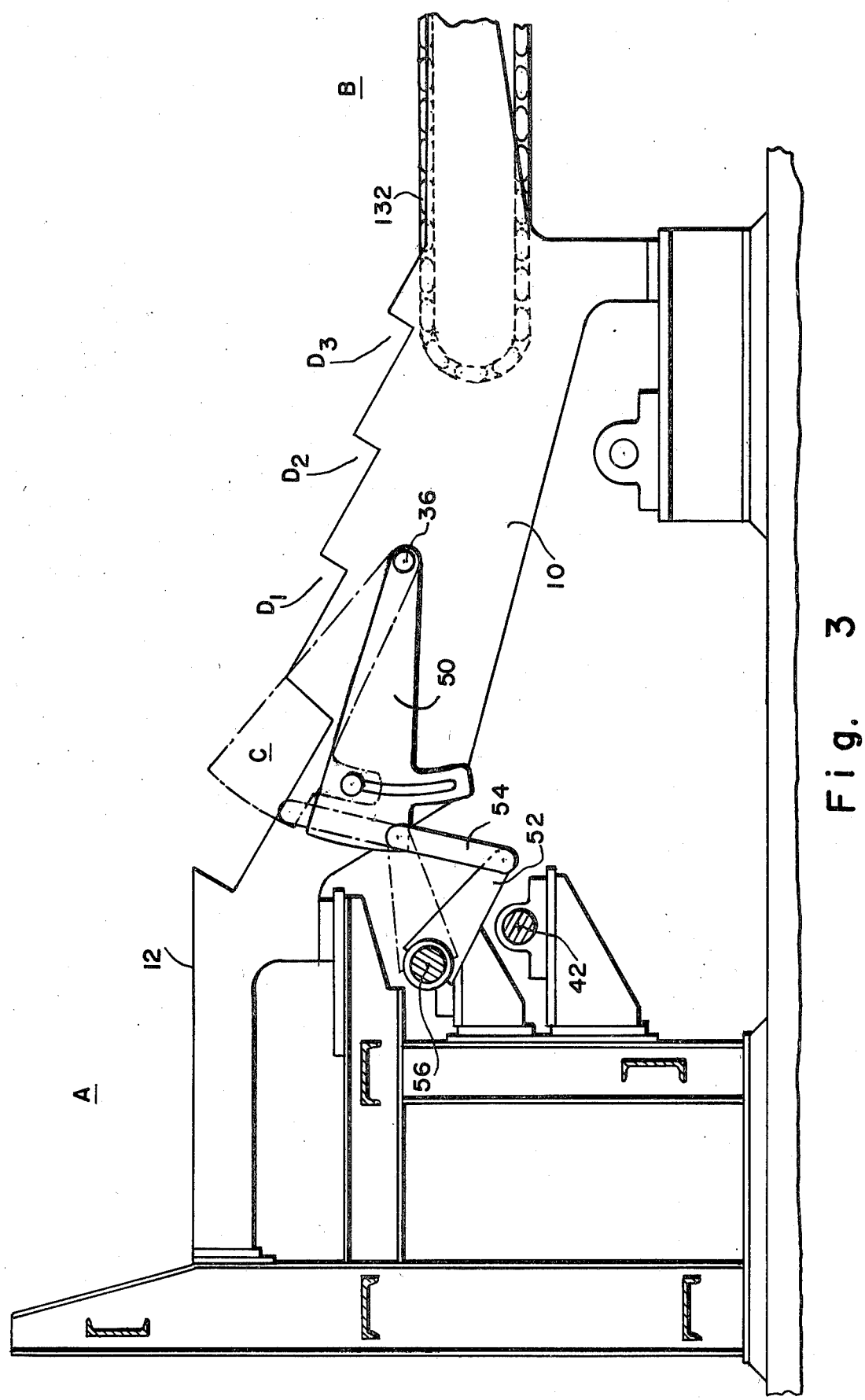

Referring now to FIGS. 1 and 3, it will be seen that discharge arms 50 are pivotally connected to the opposite sides of the rack members 10 at the points 36 of pivotal connection of the receiver arms 34 thereto. Each discharge arm is pivotally adjustable between a lowered position as indicated by the solid lines in FIG. 3 and a raised position as indicated by the dot-dash lines in the same figure. This pivotal adjustment is achieved by a crank arm 52 acting through an intermediate link 54. The crank arms 52 are keyed to another cross shaft 56 driven through a gear reducer 58 by a reversible drive motor 60.

The shuffle bars 20 operate in conjunction with the receiver arms 34, discharge arms 50 and the batch receiving station C to provide a "first transfer means" for shifting batches of bars from a pile of bars at the receiving station A into the first separating station $D_1$.

Figure 4:
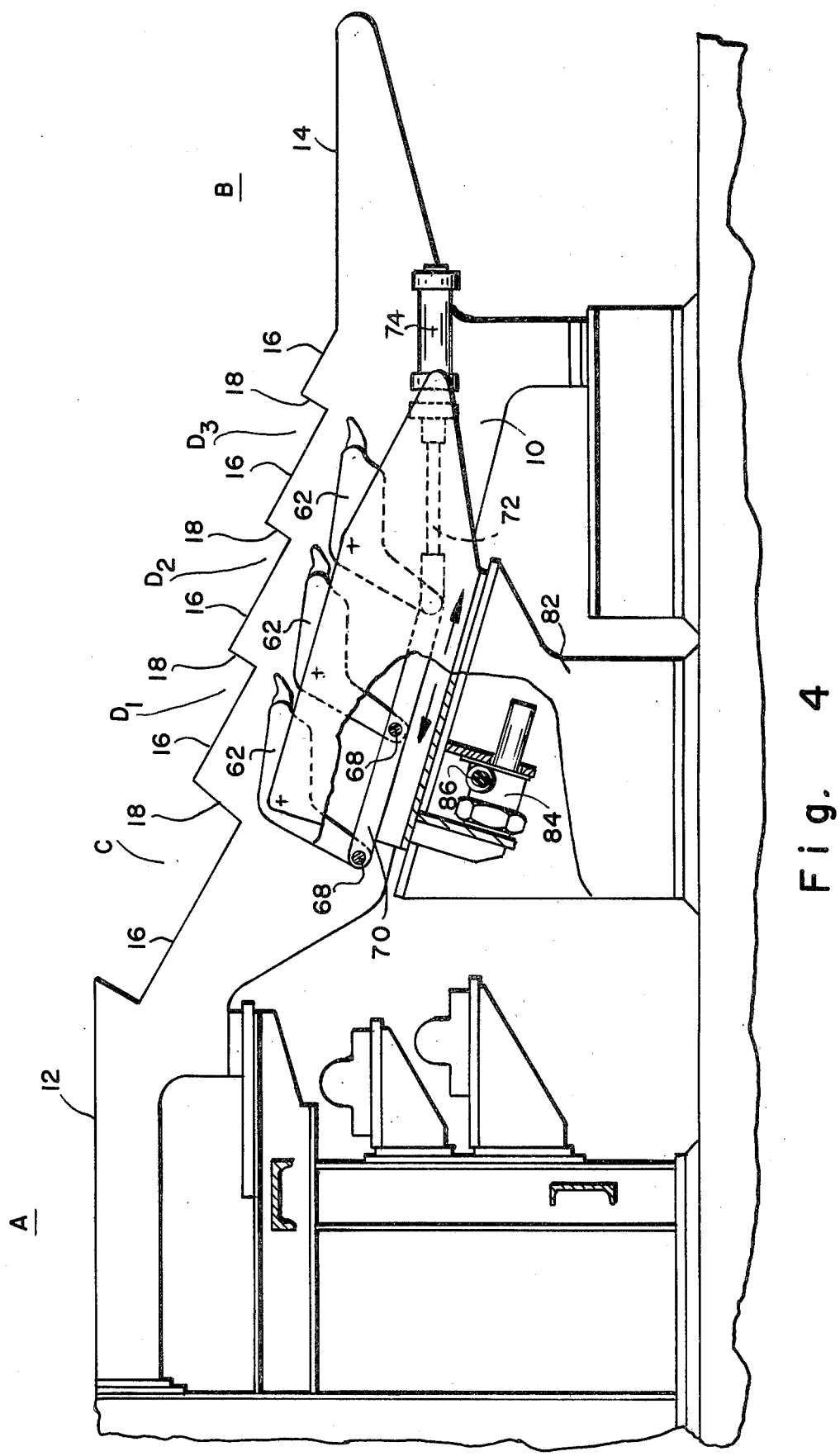
Figure 6:
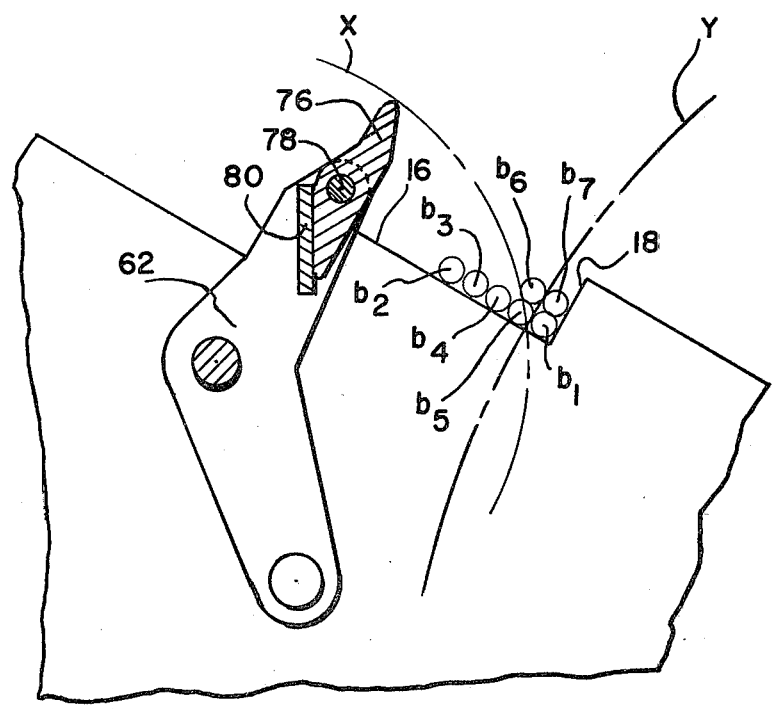
FIG. 6 is an enlarged partial view of one of the pivotal clearing arms.
Figure 7:
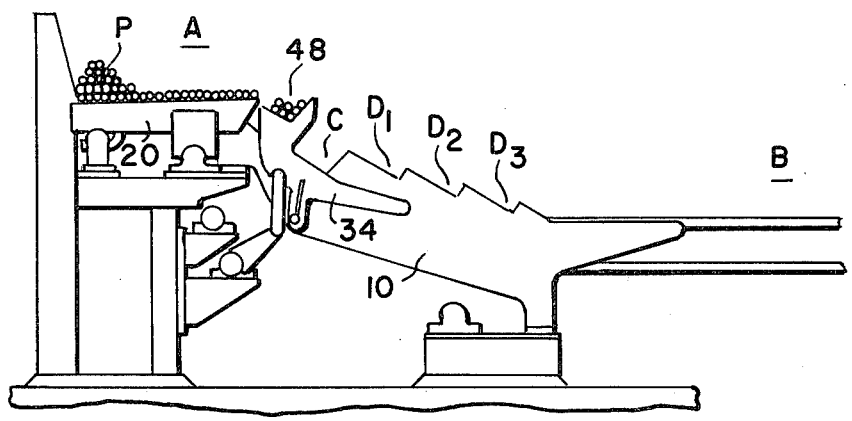
FIGS. 7–16 are somewhat schematic sectional views which sequentially illustrate the operation of the apparatus.

Referring now to FIGS. 1 and 4, clearing arms 62 are pivotally connected to a support 66 located next to each rack member 10. Each clearing arm is positioned adjacent to one of the separating stations $D_1$–$D_3$. The arms 62 are in essence bell cranks having their lower ends pivotally connected as at 68 to a common bar 70 which is in turn pivotally connected to the piston rod 72 of a cylinder 74 carried on the support 66. As can be best seen in FIG. 6, the upper ends of the clearing arms 62 each carry a clearing finger 76 pivotally connected thereto as at 78. The fingers 76 are operatively held against rotation in a counter-clockwise direction as viewed in FIG. 6 by stops 80, but are free to pivot in the clockwise direction. Each support plate 66 is carried on an underlying pedestal 82 and is adjustable in the directions indicated schematically by the arrows in FIG. 4 by means of a gear type adjustment device 84 of conventional design. The adjustment devices 84 are driven by a cross shaft 86 and a reversible drive motor 88.

Figure 5:
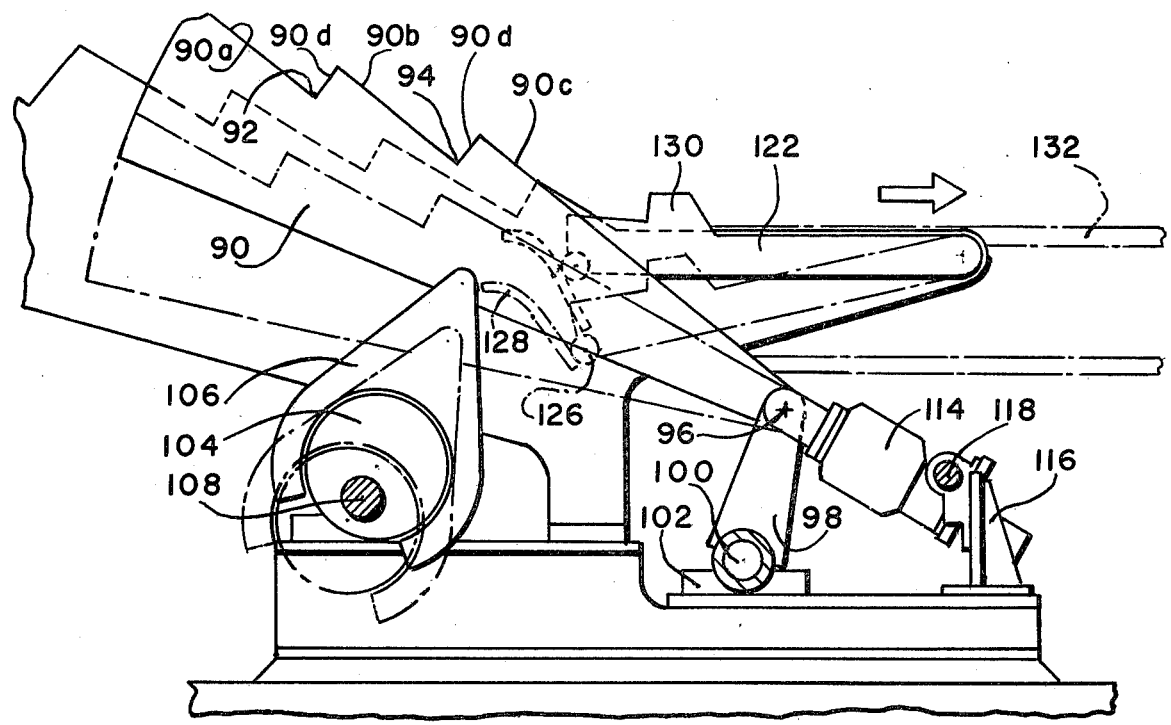

Referring now to FIGS. 1 and 5, picker arms 90 are arranged adjacent to each of the rack members 10. Each picker arm has downwardly sloping upper edge sections $90_a$–$90_c$, the first two of which cooperate with shoulders $90_d$ to define transfer notches 92, 94. The picker arms are pivotally connected as at 96 to support arms 98 which are in turn keyed to a cross shaft 100 journalled in bearings 102. The picker arms 90 are pivotally adjustable about points 96 between raised positions as shown by the solid lines in FIG. 5 and lowered positions as shown by the dot-dash lines in the same figure. This adjustment is accomplished by a rotating eccentric 104 which is captured in a yoke 106 depending from the underside of each picker arm. The eccentrics 104 are carried on a cross shaft 108 rotatably driven through a gear reducer 110 by a drive motor 112. Screw-type adjustment devices 114 join the pivotal connections 96 of each picker arm to stationary brackets 116. The adjustment devices 114 are operated by a cross shaft 118 driven by a motor 120. The adjustment devices 114 operate to shift the location of the pivot points 96, thereby adjusting the stroke of the picker arms 90 to suit different products.

Stop bars 122 are pivotally mounted at one end as at 124, with their other ends being provided with rollers 126 arranged to ride on curved tracks 128 carried by the picker arms 90. Each stop bar 122 has an upwardly protruding stop member 130. When the picker arms 90 are in their raised positions, the stop members 130 protrude above the level of conveyor chains 132 arranged at the delivery station B to receive and carry bars away in the direction indicated schematically by the arrow in FIG. 5. When the picker arms 90 are in their lower positions, the stop members 130 are ambushed beneath the level of the conveyor chains 132.

The picker arms 90 and their associated operating components provide a "second transfer means" which is movable cyclically relative to the stationary rack members 10 to shift bars from one separating station to the next towards the delivery station B, whereas the clearing arms 62 and their associated operating components provide a "third transfer means" also movable cyclically relative to the stationary rack members to shift bars from one separating station to the next in a reverse direction back towards the receiving station A.

Figure 8:
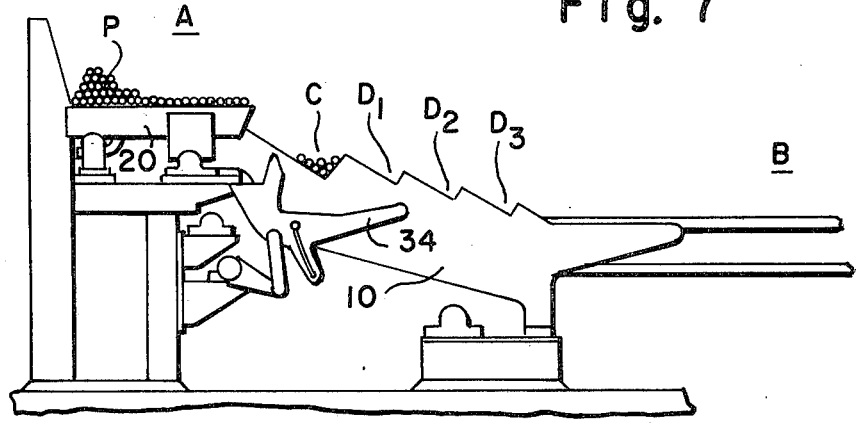
Figure 9:
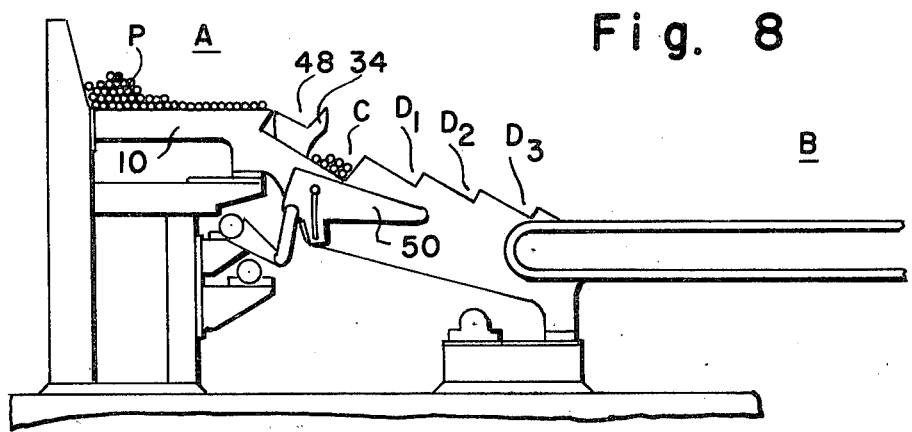
Figure 10:
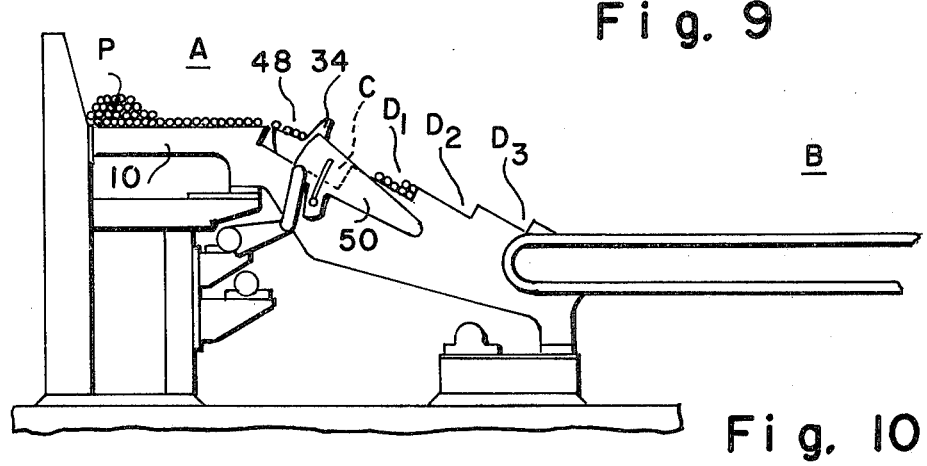

The operation of the apparatus will now be described with reference to FIGS. 7-16. Beginning at the stage shown in FIG. 7, the receiver arms 34 have been adjusted to their raised operative positions, thereby isolating the batch receiving station C from the bundle receiving station A. A random pile of bars P has been deposited at the receiving station, and the shuffle bars 20 are operating to feed some of these bars into the receiving notches 48 of the receiver arms 34. When an appropriate batch of bars has been accumulated in the receiving notches 48, the shuffle bars 20 are momentarily deactivated, and the receiver arms 34 are dropped to their lowered positions as shown in FIG. 8. When this occurs, the batch of bars in the receiving notches 48 is transferred to the batch receiving station C. As soon as this transfer has been completed, the receiver arms 34 are returned to their raised positions as shown in FIG. 9. The discharge arms 50 are then raised from their lowered positions as shown in FIG. 9 to their raised positions as shown in FIG. 10. This shifts the batch of bars from the batch receiving station C to the first separating station $D_1$. As soon as this has been accomplished, the discharge arms are again returned to their lowered positions. During this time, the shuffle bars 20 are again activated and another batch of bars begins to accumulate in the receiving notches 48 of the raised receiver arms 34.

Figure 11:
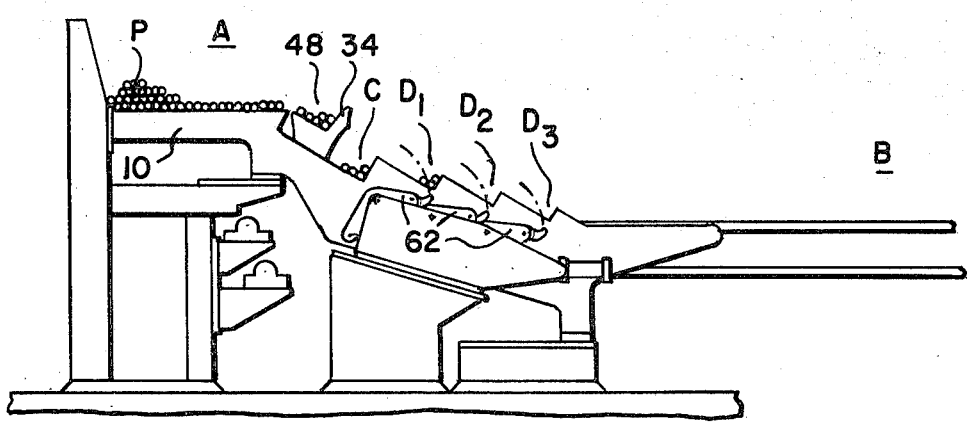

Thereafter, as shown in FIG. 11, the clearing arms 62 are cycled, resulting in a rearward shifting of some of the bars from separating station $D_1$ back to the batch receiving station C. The action of the clearing arms can be better appreciated by reference to FIG. 6. As the clearing fingers 76 traverse each separating station, their tips follow a path "x". Thus, a bar $b_1$ which is properly aligned and lying at the base of each of the corresponding laterally aligned notches of a given separating station will be by-passed, whereas other bars $b_2$–$b_5$ will be shifted rearwardly back into the preceding station. Other bars $b_6$ and $b_7$ outside the path of the clearing fingers 76 will also remain in the same separating station and will reorient themselves after the clearing operation. As the clearing arms 62 are returned to their lower position, the fingers 76 will pivot in a counterclockwise direction about points 78, thus easily by-passing any bars remaining in any of the separating stations.

Figure 12:
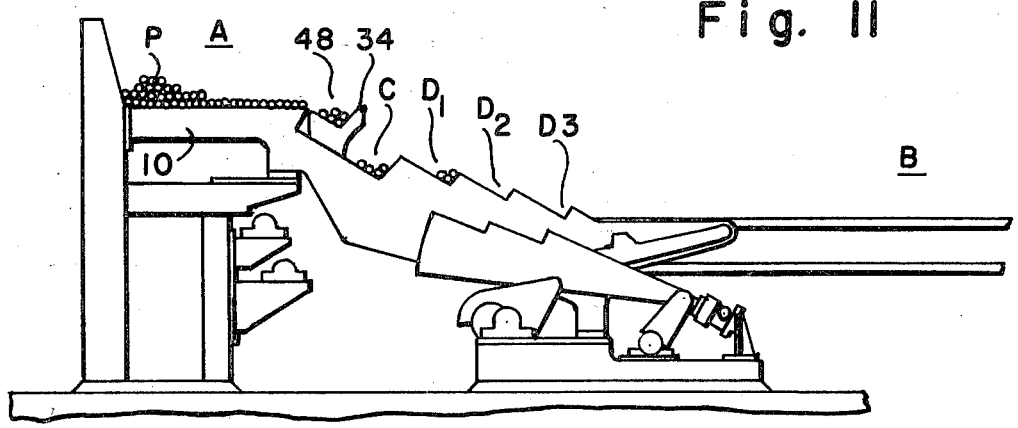
Figure 13:
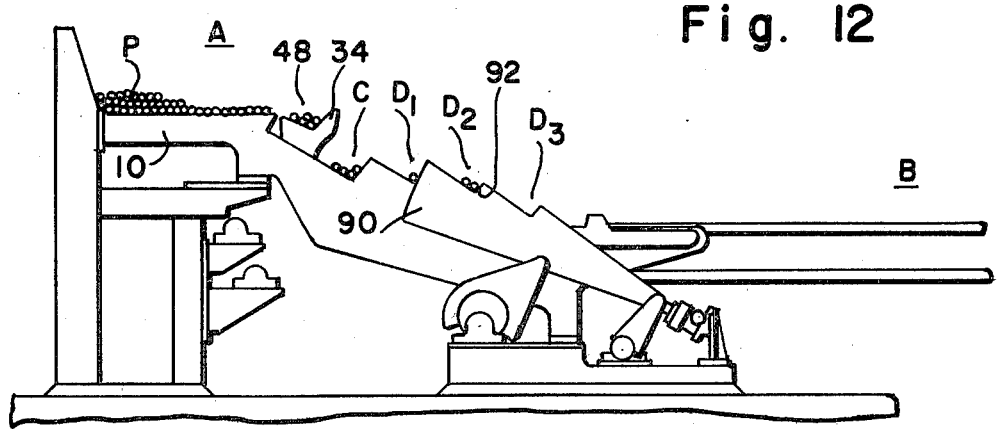

Referring now to FIG. 12, it will be understood that while the clearing arms 62 are being cycled, the picker arms 90 remain lowered. Thereafter, as shown in FIG. 13, the picker arms are adjusted to their raised positions. When this occurs, the rearmost extremities of the upper edges $90_a$–$90_c$ sweep upwardly across the separating stations $D_1$–$D_3$ along paths schematically indicated at "y" in FIG. 6. This in turn removes any bars $b_1$ lying exclusively at the bases of the separating stations as well as other bars $b_7$ lying against the edge sections 18 of the fixed racks. These bars are then momentarily captured in one of the transfer notches of the picker arms. For example, at the stage shown in FIG. 13, two bars have been removed from separating station $D_1$ and are momentarily being held in the transfer notches 92 of the picker arms. Thereafter, when the picker arms are returned to their lowermost positions, the two bars previously retained in the transfer notches 92 will be redeposited in the separating station $D_2$.

Figure 14:
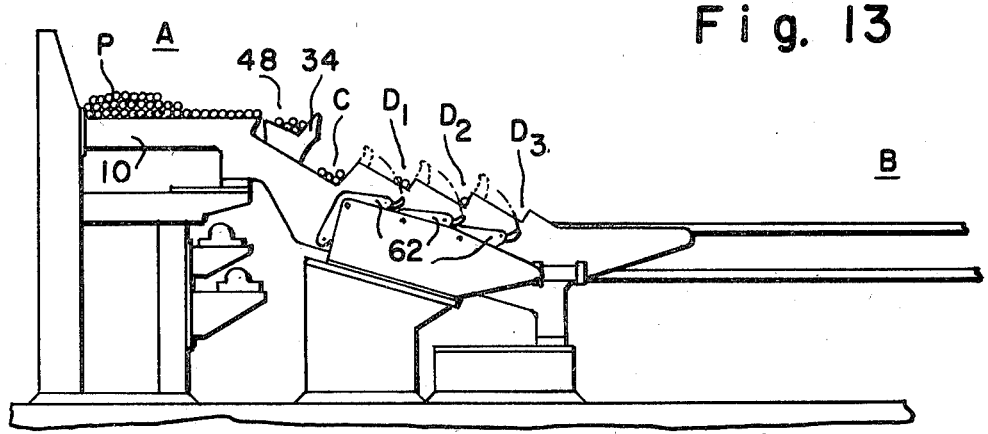
Figure 15:
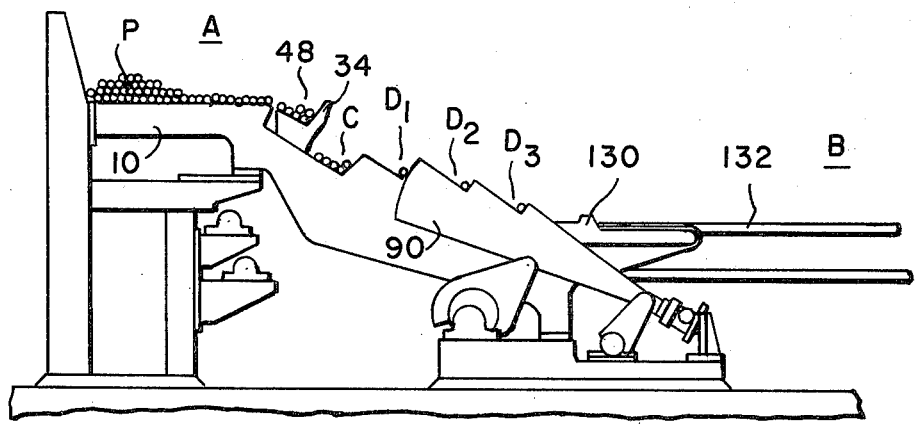
Figure 16:
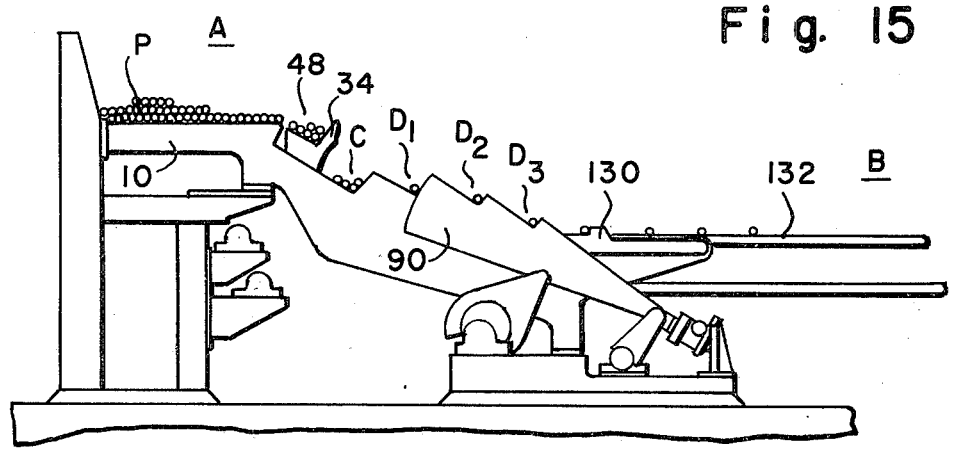

As shown in FIG. 14, the clearing arms 62 are then cycled again. This results in all but a single bar being cleared from separating station $D_2$, with one of the bars previously in that station being again shifted rearwardly back to separating station $D_1$. Thereafter, as shown in FIG. 15, the picker arms 90 are again cycled and after they are lowered, there remains a single bar in each of the separating stations $D_1$, $D_2$ and $D_3$. Thereafter, further cycling of the clearing arms 62 will have no effect because their clearing fingers will simply bypass the single properly aligned bars in each of the separating stations. These bars will be progressively advanced by the picker arms onto the chain conveyor 132 at the delivery station B. As previously described, while this is occurring, the stop members 130 on the pivotal stop bars 122 will coact with the conveyor 132 to produce a lateral spacing between the bars being deposited thereon.

When a product change is made, for example from a small diameter round to one having a larger diameter, the paths x of the clearing fingers 76 and the paths y of the picker arms are appropriately shifted by energizing the motors 88, 120 to operate the adjustment devices 84, 114.

Figure 17:
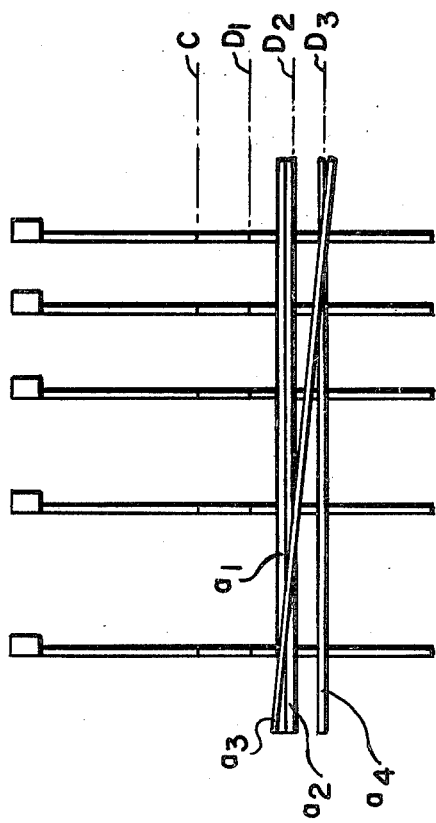
FIGS. 17–20 are additional schematic plan views which sequentially show how the apparatus handles a skewed bar.
Figure 18:
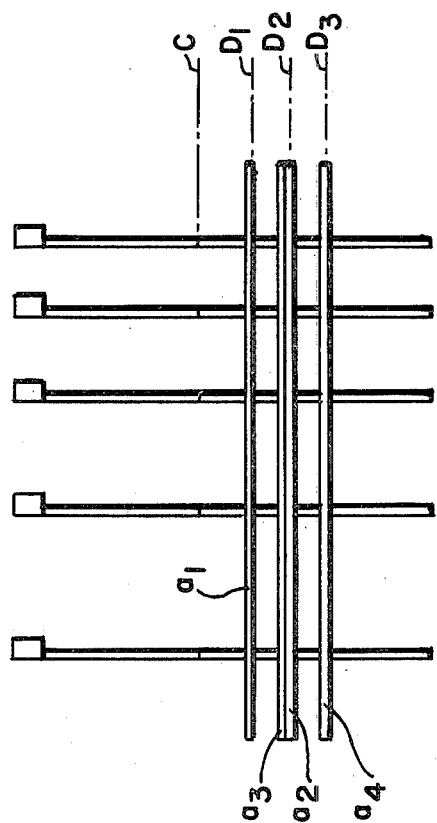
Figure 19:
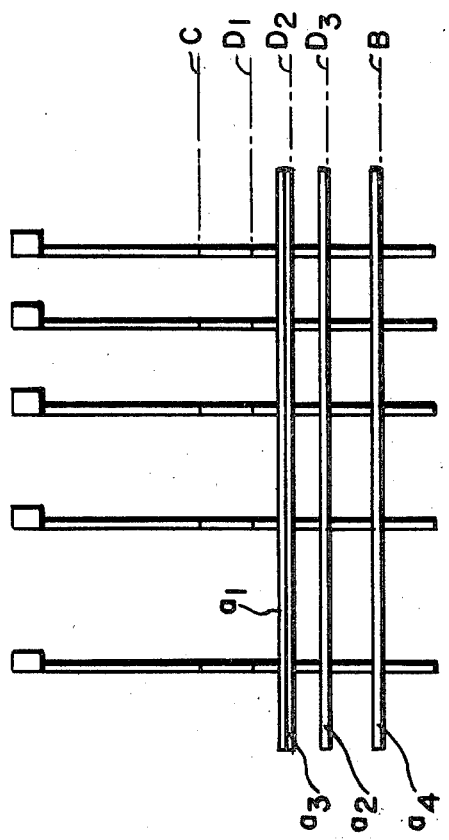
Figure 20:
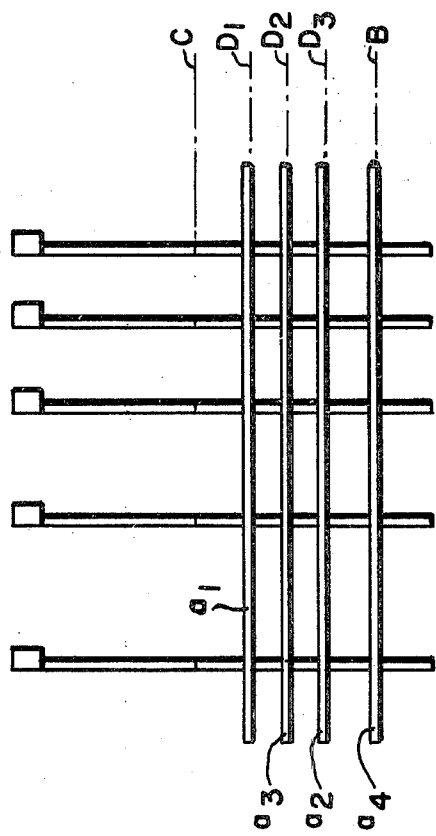

The ability of the apparatus to handle skewed or jackstrawed bars is best shown in FIGS. 17–20. In FIG. 17, the separating station $D_1$ is empty, the separating station $D_2$ contains bars $a_1$ and $a_2$. Bar $a_2$ is properly aligned at the base of station $D_2$, whereas bar $a_1$ lies rearwardly of bar $a_2$ on the downwardly inclined edges 16. Another bar $a_3$ is skewed or jackstrawed from separating station $D_2$ to separating station $D_3$ where it overlies another bar $a_4$ properly aligned at the base of station $D_3$. Normally, with the prior art devices, this condition would require operating personnel to manually reorient the skewed bar $a_3$. However, with the present invention, this operation can be performed automatically. More particularly, as shown in FIG. 18, by cycling the clearing arms 62, the offending bar $a_3$ will be pushed back from separating station $D_3$ into separating station $D_2$. At the same time, bar $a_1$ will be kicked back to separating station $D_1$. Thereafter, as shown in FIG. 19, by cycling the picker arms 90, bar $a_4$ will be transferred to the discharge station B, bar $a_2$ will be advanced to separating station $D_3$, bar $a_3$ will roll into the base of separating station $D_2$, and bar $a_1$ will be transferred from separating station $D_1$ to separating station $D_2$. Finally, by again cycling the clearing arms 62, bar $a_1$ will be returned to separating station $D_1$ while the bars $a_3$ and $a_2$ remain undisturbed at the separating stations $D_2$, $D_3$, and the bar $a_4$ is removed laterally by the conveyor chains 132 at delivery station B.

In light of the foregoing, those skilled in the art will appreciate that the present invention provides an improved apparatus and method for unscrambling bars and other like elongated elements, without requiring operating personnel to manually reorient skewed or jackstrawed bars. This increases the productive capacity of the mill facility while at the same time improving the working conditions of operating personnel.

I claim:

1. Apparatus for unscrambling and separating a plurality of elongated elements randomly deposited in a pile at a receiving station, comprising:
   parallel stationary rack members extending from said receiving station to a discharge station, said rack members having upwardly facing notches aligned laterally to form a succession of element separating stations,
   first transfer means for shifting batches of elongated elements from the pile at said receiving station into the first of said separating stations,
   second transfer means movable cyclically relative to said stationary rack members to shift elongated elements from one separating station to the next towards said discharge station;
   third transfer means movable cyclically relative to said stationary rack members to shift elongated elements from one separating station to the next towards said receiving station, said third transfer means being arranged to bypass at least selected elements supported exclusively at the bases of the laterally aligned notches forming each separating station; and
   means for operating said second and third transfer means in alternating cycles in order to deliver individual elongated elements from the last of said separating stations to said discharge station.

2. The apparatus of claim 1 wherein said fixed rack members have first and second upper edge sections which are inclined respectively downwardly and upwardly in a direction towards said receiving station, said first and second edge sections converging to define said notches.

3. The apparatus of claim 2 wherein the elements shifted by said third transfer means lie at least partly on the first edge sectios of said notches.

4. The apparatus of either claims 2 or 3 wherein the elements shifted by said second transfer means include said selected elements as well as other elements lying against the second edge sections of said notches.

5. Apparatus for unscrambling and separating a plurality of elongated elements randomly deposited in a pile at a receiving station, comprising: laterally spaced stationary rack members extending in a forward direction from said receiving station to a discharge station, said rack members having first and second upper edge sections which are inclined respectively downwardly and upwardly in said forward direction, with successive first and second edge sections converging to define a succession of notch-shaped separating stations, and with the corresponding separating stations of said rack members being aligned laterally; first transfer means for shifting batches of elongated elements from the pile at said receiving station into the first of said separating stations; and, second and third transfer means movable relative to said stationary rack members, the path of movement of said second transfer means being arranged to bypass selected elements extending between and supported exclusively at the bases of corresponding laterally aligned separating stations and to transfer other elements lying at least partly on the first edge sections of said separating stations rearwardly to preceding separating stations, the path of movement of said third transfer means being arranged to transfer only said selected elements as well as other elements lying against the second edge sections of said separating stations forwardly to succeeding stations, whereupon operation of said second and third transfer means in an alternating sequence will result in individual elements being fed forwardly to said discharge station.

* * * * *